US006725366B1

(12) United States Patent
Swanberg (10) Patent No.: US 6,725,366 B1
(45) Date of Patent: Apr. 20, 2004

(54) SYSTEM AND METHOD FOR 32 BIT CODE BRANCHING TO 64 BIT TARGETS

(75) Inventor: Randal Craig Swanberg, Round Rock, TX (US)

(73) Assignee: International Business Machines, Corporation, Armonk, NY (US)

( * ) Notice: Subject to any disclaimer, the term of this patent is extended or adjusted under 35 U.S.C. 154(b) by 607 days.

(21) Appl. No.: 09/657,115

(22) Filed: Sep. 7, 2000

(51) Int. Cl.$^7$ .............................................. G06F 12/10
(52) U.S. Cl. ...................................... 712/233; 711/220
(58) Field of Search ................................ 711/203, 220; 712/233

(56) References Cited

U.S. PATENT DOCUMENTS

| | | | | |
|---|---|---|---|---|
| 5,826,057 A | * | 10/1998 | Okamoto et al. | 703/24 |
| 6,199,202 B1 | * | 3/2001 | Coutant et al. | 717/138 |
| 6,301,631 B1 | * | 10/2001 | Chambers et al. | 710/313 |
| 6,308,247 B1 | * | 10/2001 | Ackerman et al. | 711/206 |
| 6,393,544 B1 | * | 5/2002 | Bryg et al. | 711/220 |

OTHER PUBLICATIONS

Intel IA–64 Architecture Software Developer's Manual, vol. 2: IA–64 System Architecture, Revision 1.1, Jul. 2000, Chapter 4.1, p. 4–1–4–24.

* cited by examiner

*Primary Examiner*—Eric Coleman
(74) *Attorney, Agent, or Firm*—Joseph T. Van Leeuwen; Diana L. Roberts (57) ABSTRACT

A system and method for converting 32 bit addresses into 64 bit addresses and enabling the 32 bit address to include a region index. The region index is stored in low order bits of the 32 bit address. In some architectures, namely the Intel IA-64 architecture, the low order bits are not used in entry point addresses because each entry point is on a 16 byte boundary. In the case of the IA-64 architecture, the low 4 bits of a 64 bit module entry point address are ignored. The region index in a 64 bit IA-64 address is stored in the high 3 bits of the address. Region index information is stored in the low order bits of the 32 bit address and copied to the high order bits for the corresponding 64 bit address. In this manner, the 32 bit address can include memory region index information without compromising the normal 4 gigabyte address space for a 32 bit address. By storing the memory index information, the 32 bit address is able to address a module entry point in any of the eight memory regions found in the IA-64 architecture. In addition, an additional bit in the 32 bit address is usable to further expand the addressable range of the 32 bit address when converted to operate in a 64 bit environment.

37 Claims, 7 Drawing Sheets

SYSTEM AND METHOD FOR 32 BIT CODE BRANCHING TO 64 BIT TARGETS

BACKGROUND OF THE INVENTION

1. Technical Field

The present invention relates in general to a method and system for addressing 64 bit memory addresses. More particularly, the present invention relates to a system and method for using a 32 bit address for branching into a 64 bit target address.

2. Description of the Related Art

Computer systems in general and International Business Machines (IBM) compatible personal computer systems in particular have attained widespread use for providing computer power to many segments of today's modern society. Systems with microprocessors are finding themselves in an array of smaller and more specialized objects that previously were largely untouched by computer technology. Computer systems typically include a system processor and associated volatile and non-volatile memory, a display area, input means, and often interfaces, such as a network interface or modem, to other computing devices.

These computing devices are information handling systems which are designed primarily to give independent computing power to a single user, or a group of users in the case of networked computing devices. Personal computing devices are often inexpensively priced for purchase by individuals or businesses. Nonvolatile storage devices such as hard disks, CD-ROM drives and magneto-optical drives are considered to be peripheral devices. Computing devices are often linked to one another using a network, such as a local area network (LAN), wide area network (WAN), or other type of network, such as the Internet.

One of the distinguishing characteristics of these systems is the use of a system board to electrically connect these components together. At the heart of the system board is one or more processors. System manufacturers continually strive for faster, more powerful processors in order to supply systems for demanding applications. Processors, in turn, have evolved from simple 8 bit microprocessors all the way to current 64 bit processors. The addressable memory of these processors has likewise grown exponentially. Thirty-two bit microprocessors, such as IBM's 32-bit Power PC processor and Intel's Pentium processor, could access $2^{32}$ bytes of virtual memory (4 gigabytes). Meanwhile, 64 bit processors, such as Intel's IA-64 can access $2^{64}$ bytes of virtual memory. The Intel IA-64 processor divides its memory into 8 separate regions. The three highest order bits (bits 63, 62, and 61) of a memory address determine the memory region that will be used, as set forth below:

| High order bits (bits 63–61) | Resulting Memory Region |
|---|---|
| 000 | 0 |
| 001 | 1 |
| 010 | 2 |
| 011 | 3 |
| 100 | 4 |
| 101 | 5 |
| 110 | 6 |
| 111 | 7 |

While increasing the power and addressable memory space is advantageous, a large number of programs have already been written to operate in 32 bit environments. In a 64 bit architecture, a 32 bit address only uses the low 32 bits of the possible 64 bits. Therefore, the high order bits, including the bits determining the memory region, will be equal to zero (0). As a result, 32 bit programs only address memory in the first 4 GB memory area in the first region (region 0).

One of the reasons memory regions were established in the IA-64 architecture was to promote shared memory. If certain data, such as shared library text or read-only data, is used by more than one program running in the IA-64 architecture, a single copy can be placed in a region and shared amongst the programs. The MMU is used to fetch the data from physical memory.

The MMU (memory management unit), is a hardware component that manages virtual memory systems, including the virtual memory in the IA-64 architecture. Typically, the MMU is part of the CPU, though in some designs it is a separate chip. The MMU includes a small amount of memory that holds a table matching virtual addresses to physical addresses. This table is called the page table. All requests for data are sent to the MMU, which determines whether the data is in RAM or needs to be fetched from a nonvolatile storage device, such as a hard disk drive. If the data is not in memory, the MMU issues a page fault interrupt.

While it may be advantageous to use different regions for different types of shared memory, a challenge exists with legacy 32 bit programs in accessing these shared memory areas. The region where the 32 bit program is running must have its own copy of these shared memory areas in order to read from them. Translation look aside buffers (TLBs) are hardware storage registers that keep the most recently used translations for loaded page tables entries. Maintaining additional copies of shared memory in order to provide access to 32 bit programs is costly in terms of increased context switching and increased thrashing of translation hardware facilities such as page table entries and TLBs.

Other approaches have been developed to allow 32 bit programs to run within a 64 bit environment. The first approach is to zero extend the 32 bit addresses to be 64 bits in length. With this solution, however, bits 63–61 (the bits that determine the memory region) will equal 0 and, consequently, will always address memory region 0.

A second approach is to use the two highest order bits in the 32 bit address (bits 31 and 30) and use the bit values for the high order bits in the 64 bit address (bits 61 and 62). This approach does allow use of four memory regions (due to setting 2 of the 3 bits that determine a region index), however this approach introduces new challenges. Because the two high order bits of the 32 bit address are used for bits 63 and 62, only 30 bits remain from the original 32 bit address. Therefore, only 1 GB is addressable in each of the accessible regions. In addition, because only 2 bits are used, only 4 of the 8 memory regions are accessible. Shared memory in inaccessible regions still needs to have a copy maintained in an accessible region in order to be read by the 32 bit program. Moreover, because the 4 GB memory space from the 32 bit environment is spread across four regions, programs stepping through memory need to be redirected to another region when one of the 1 GB memory boundaries is crossed.

[ADD PROBLEM WHERE 0 starts at 0, REGION 1 STARTS AT 1GB, etc.]

A third approach is to sign-extend the 32 bit address. This approach allows access to two memory regions (region 0 if the high order bit (bit 31) is zero, and region 7 if the high order bit is one). This approach, again, presents significant challenges. Each of these two memory areas is only 2 GB in size ($2^{31}$), rather than 4 GB because the high order bit is sign extended to determine the region index. Also, only two of the possible eight regions are accessible. If shared memory exists in any of the other six regions, a copy of the shared memory is needed in one of the two accessible regions. Moreover, because the 4 GB memory space from the 32 bit environment is spread across two regions, programs stepping through memory need to be redirected to another region when the 2 GB memory boundaries is crossed.

What is needed, therefore, is a method for 32 bit applications to access any region in a 64 bit environment without losing the normal contiguous 4 GB address footprint of a 32 bit process.

SUMMARY

It has been discovered that a region index can be stored in low order bits (bits 0, 1, and 2) of a 32 bit address with minimal performance impact. A region index is stored in the high order bits of a 64 bit address. In the IA-64 architecture, there are eight memory regions and thus three corresponding high order bits used to address the desired memory region.

In some 64 bit architectures, including the IA-64 architecture, code entry points are set at certain minimal intervals to improve performance and system management. For example, the IA-64 architecture specifies that code entry points are on 16 byte boundaries. Because of this specification, the 4 low-order bits of a calling address are ignored since those bits would determine an address within a 16 byte region. In the present invention, these unused bits locations are used when processing 32 bit programs to store a region index in order to address a different memory region. In this manner, shared libraries and other shared data residing in other regions can be accessed by 32 bit programs, thus improving the performance of 32 bit programs operating in a 64 bit operating environment. External program calls are processed by the run-time linker. External program calls such as library calls and system calls are updated to store the region index of the corresponding library call or system call in the low 3 bits. Control is then passed to the 32 bit program's entry point where the instructions are processed. When the instructions are processed, out of module calls use glue code to bind the 32 bit instructions to the 64 bit operating environment. During the execution of the glue code, the region index that is stored in the 3 low order bits is copied into the high order bits of the corresponding 64 bit instruction. After the bits have been copied, the program branches to the 64 bit address.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
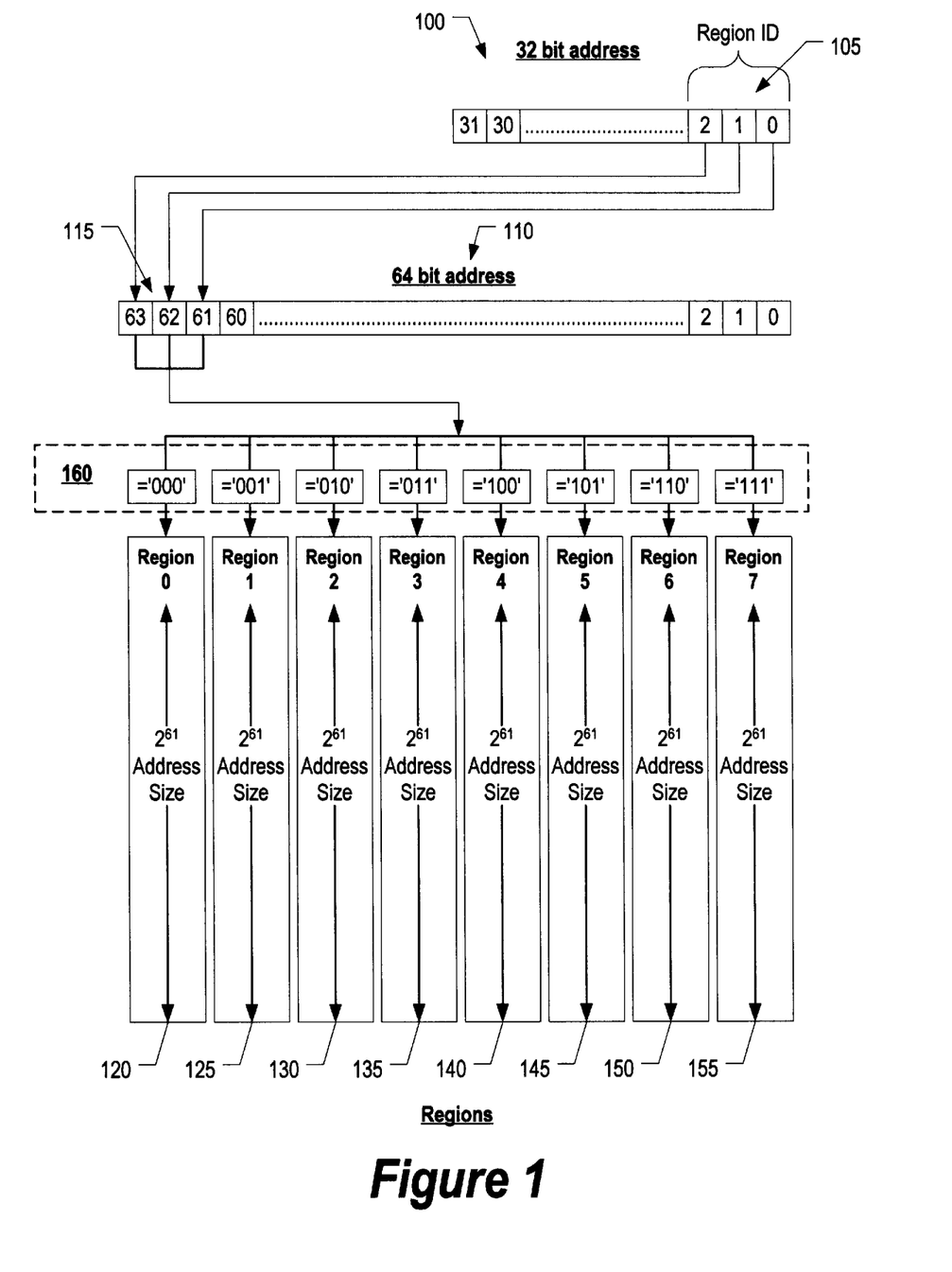
FIG. 1 is a block diagram of a 32 bit address accessing a memory region in a 64 bit architecture.

FIG. 1 shows a 32 bit address being converted to a 64 bit address that is capable of identifying a region within the 64 bit operating environment. As the name implies, 32 bit address 100 includes 32 bits. The highest order bit is numbered 31 and the lowest order bit is numbered 0. Region ID 105 is stored in the 3 low order bits, namely bits 0, 1, and 2. By using 3 bits, region ID 105 is able to address 8 unique regions within the 64 bit architecture. The bits comprising Region ID 105 are copied to the high order bits of 64 bit address 110. Again, as the name implies 64 bit address 110 includes 64 bits. The lowest order bit is numbered 0 and the bits are numbered consecutively up to the highest order bit which is numbered 63. Region index bits 115 include the 3 highest order bits, namely 63, 62, and 61. As shown, the value of bit number 0 in 32 bit address 100 is copied to bit number 61 in 64 bit address 110. Likewise, the value of bit number 1 within 32 bit address 100 is copied to bit number 62 of 64 bit address 110, and the value of bit number 2 within 32 bit address 100 is copied to bit number 63 of 64 bit address 110.

The value of region index bits 115 can be one of 8 different unique values. Region selector 160 shows the 8 possible bit values and the corresponding region identified by each of the possible values. If the region index bits are '000' the corresponding region is Region 0 (120). If the region index bits are '001' the corresponding region is Region 1 (125). If the region index bits are '010' the corresponding region is Region 2 (130). If the region index bits are '011' the corresponding region is Region 3 (135). If the region index bits are '100' the corresponding region is Region 4 (140). If the region index bits are '101' the corresponding region is Region 5 (145). If the region index bits are '110' the corresponding region is Region 6 (150). And finally, if the region index bits are '111' the corresponding region is Region 7 (155).

Figure 2:
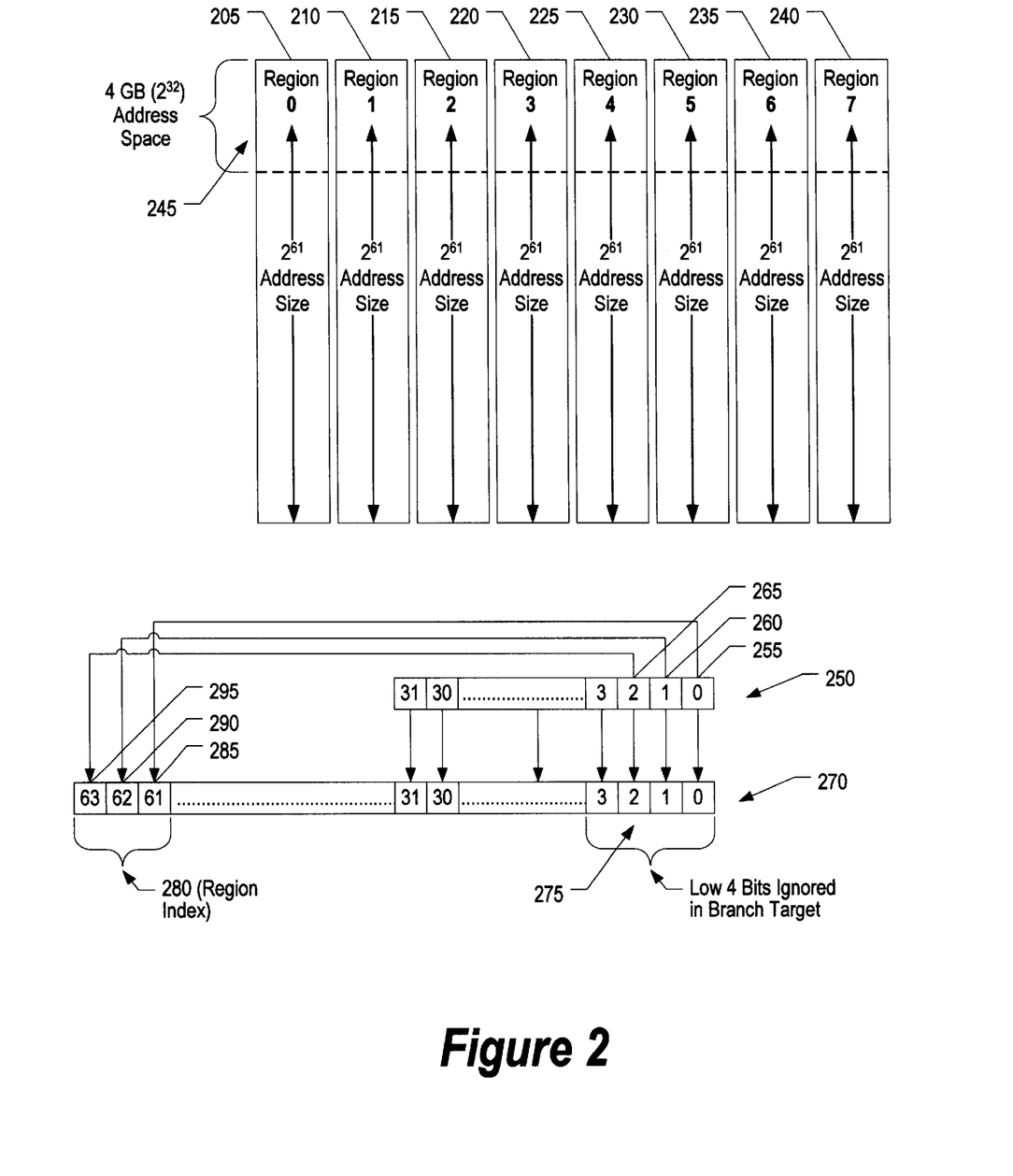
FIG. 2 is a block diagram of bit transformation between a 32 bit address and a corresponding 64 bit address.

FIG. 2 shows the typical memory area accessible by a 32 bit program using the present invention. Within each region (Region 0 (205), Region 1 (210), Region 2 (215), Region 3 (220), Region 4 (225), Region 5 (230), Region 6 (255), and Region 7 (240)), a 32 bit program can branch into the first 4 gigabytes (245) of any region ($2^{32}$ =4,294,967,296). As described in FIG. 1, 32 bit address (250) stores a region index in the address' 3 low order bits (bit 0 (255), bit 1 (260), and bit 2 (265)). These bits are copied to corresponding 64 bit address (270) and stored in high order bits (bit 61 (285) receives the value from bit 0 (255), bit 62 (290) receives the value from bit 1 (260), and bit 63 (295) receives the value from bit 2 (265)). The low order bits from 32 bit instruction (250) are also copied to corresponding low order bits (275) in 64 bit address (270). This avoids an extra step of setting the low order bits to zero prior to copying. Since the 4 low order bits (275) of 64 bit branch target address (270) are ignored in the IA-64 architecture, it does not matter what values are in low order bits (275). In addition, the 4 gigabyte address space (245) can be further expanded by utilizing the extra bit (bit number 3) that is also ignored in 64 bit address (270). By utilizing the extra bit, it is possible to expand the address space to 8 gigabytes per region, or to index to an address space consisting of 16, rather than 8, regions.

Figure 3:
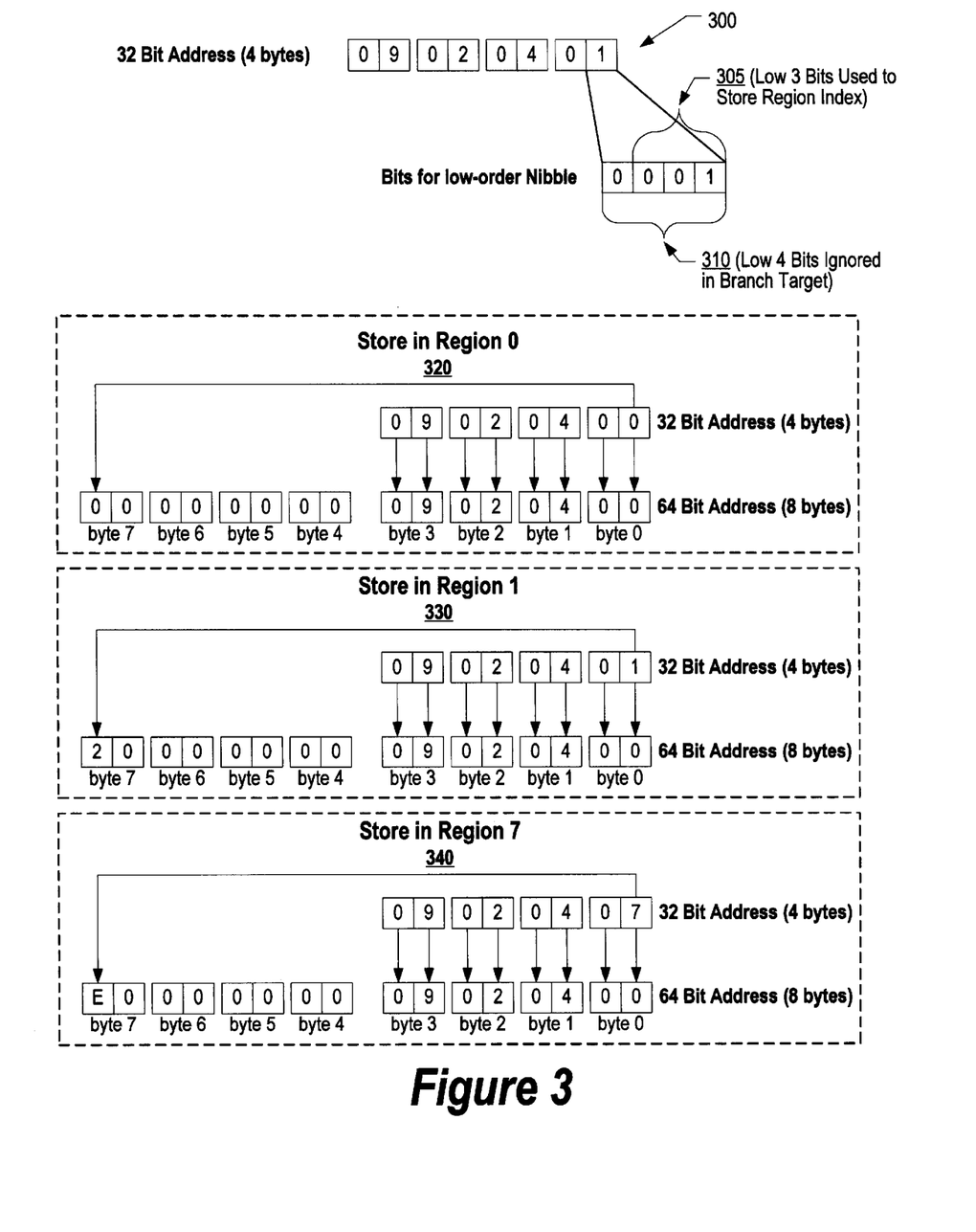
FIG. 3 is a block diagram of example 32 bit addresses addressing various regions in a 64 bit architecture.

FIG. 3 shows 32 bit address (300) in hexadecimal byte nomenclature. The low half (a half of a byte is sometimes referred to as a "nibble") of the low-order byte is shown containing a region index. Low order nibble (310) is ignored in the resulting 64 bit address. As explained above, region index bits (305) are stored in low order nibble (310) and used to determine the resulting 64 bit region index. The remainder of FIG. 3 shows three examples of preparing the 32 bit address to address various regions. Address Region 0 example (320) stores zeros in the low order nibble. The 3 lowest order bits are copied to the 3 high order bits of byte 7 as well as the 3 low order bits of byte 0. Address Region 1 example (330) stores '0001' in the low order nibble of byte 0 in the 32 bit address. The three low order bits ('001') are copied to the 3 high order bytes resulting in a hexadecimal '2' value for the high order nibble in the 64 bit address (0010=hex 2). Finally, addressing region 7 example (340) sets the 3 low order bits to '1' ('111'). When these bits are copied to the 3 high order bits in the 64 bit address, it results in '1110' (hexadecimal 'E') stored in the high order nibble.

Figure 4:
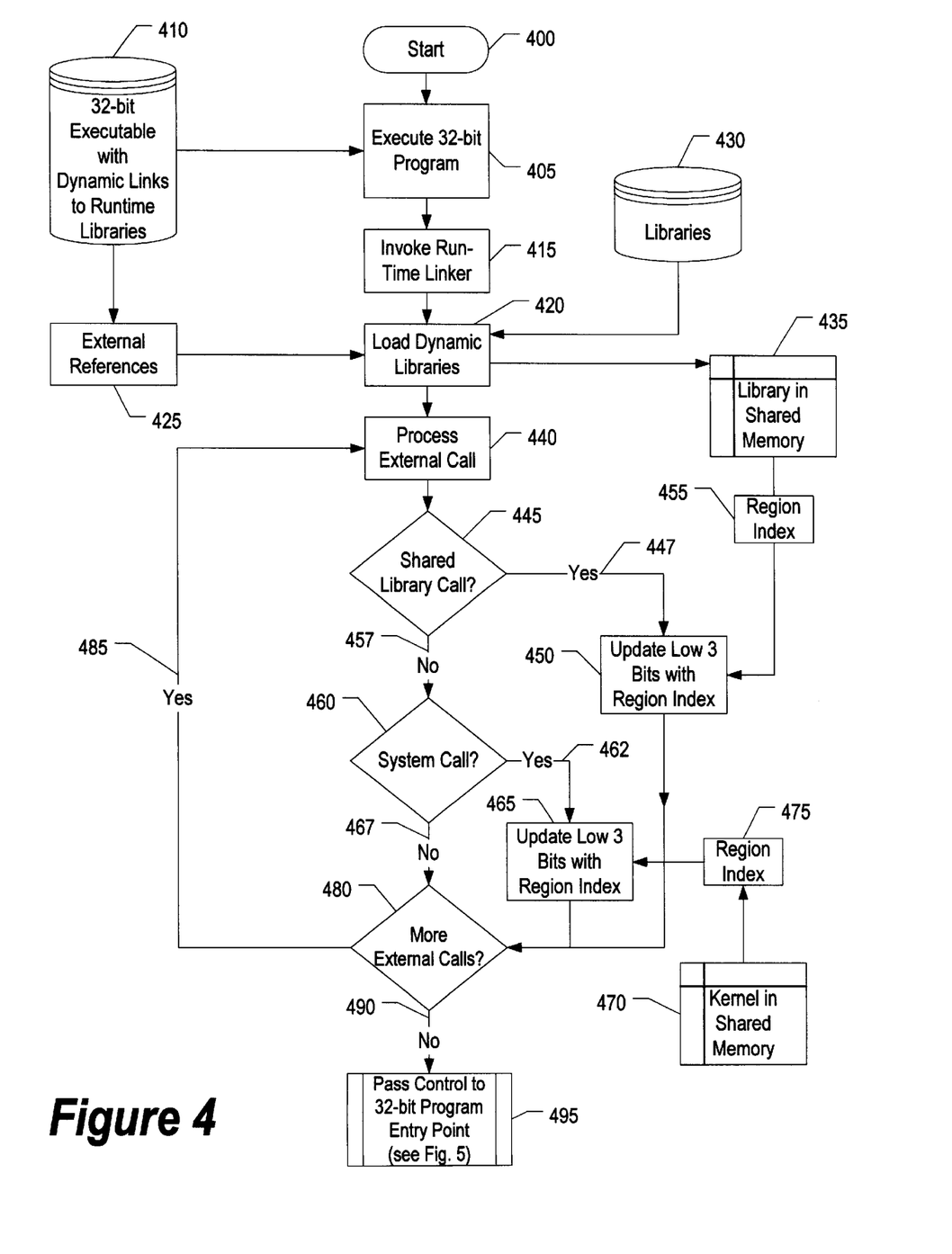
FIG. 4 is a flowchart of 32 bit program execution in a 64 bit environment.

FIG. 4 shows a flowchart for executing 32 bit programs in a 64 bit environment and enabling the 32 bit addresses to access regions within the 64 bit environment. Processing commences (400) whereupon a request to execute a 32 bit program (405) is received within a 64 bit environment. The 32 bit program is read from a nonvolatile storage device, such as a hard drive (410). The 32 bit executable includes dynamic links to runtime libraries, also called "out of module" calls. The runtime linker is invoked to link the 32 bit executable with its out of module libraries (415). Dynamic libraries are loaded (420) by reading the external references (425) identifying the out of module libraries used by the 32 bit executable and loading the corresponding libraries from a nonvolatile storage device (430). If the library has already been loaded, perhaps by another process, the shared memory location where the library resides is used rather than loading the library from a nonvolatile storage device. If the library is loaded, it is loaded into a shared memory area (435). Shared memory areas are preferably the low 4 gigabyte address space in a given region so that a 32 bit address can access the shared memory.

The first external call, or reference, is then processed (440). A determination is made as to whether the external call is to a shared library (decision 445). If the call is to a shared library, "yes" branch 447 is taken and the low 3 bits of the 32 bit address are modified (step 450) to contain the region index (455) of the shared library. On the other hand, if the call is not to a shared library, "no" branch 457 is taken whereupon a second decision is made as to whether the external call is a system call (decision 460). If the external call is a system call, "yes" branch 462 is taken and the low 3 bits of the 32 bit address are modified (step 465) to contain the region index (475) of the kernel entry point stored in shared memory (470). If the external call is not a system call, "no" branch is taken whereupon a decision is made as to whether there are more external calls to process (decision 480). If there are more external calls to process, "yes" branch 485 is taken looping back to process the next external call (step 440). On the other hand, if there are no more external calls to process, "no" branch 490 is taken whereupon control is passed to the entry point of the 32 bit program (predefined process 495, see FIG. 5 for further detail). Note that the 32 bit program that is given control has been modified by the logic shown in the flowchart of FIG. 4 to address other regions by storing region indices in the low order bits of out of module calls.

Figure 5:
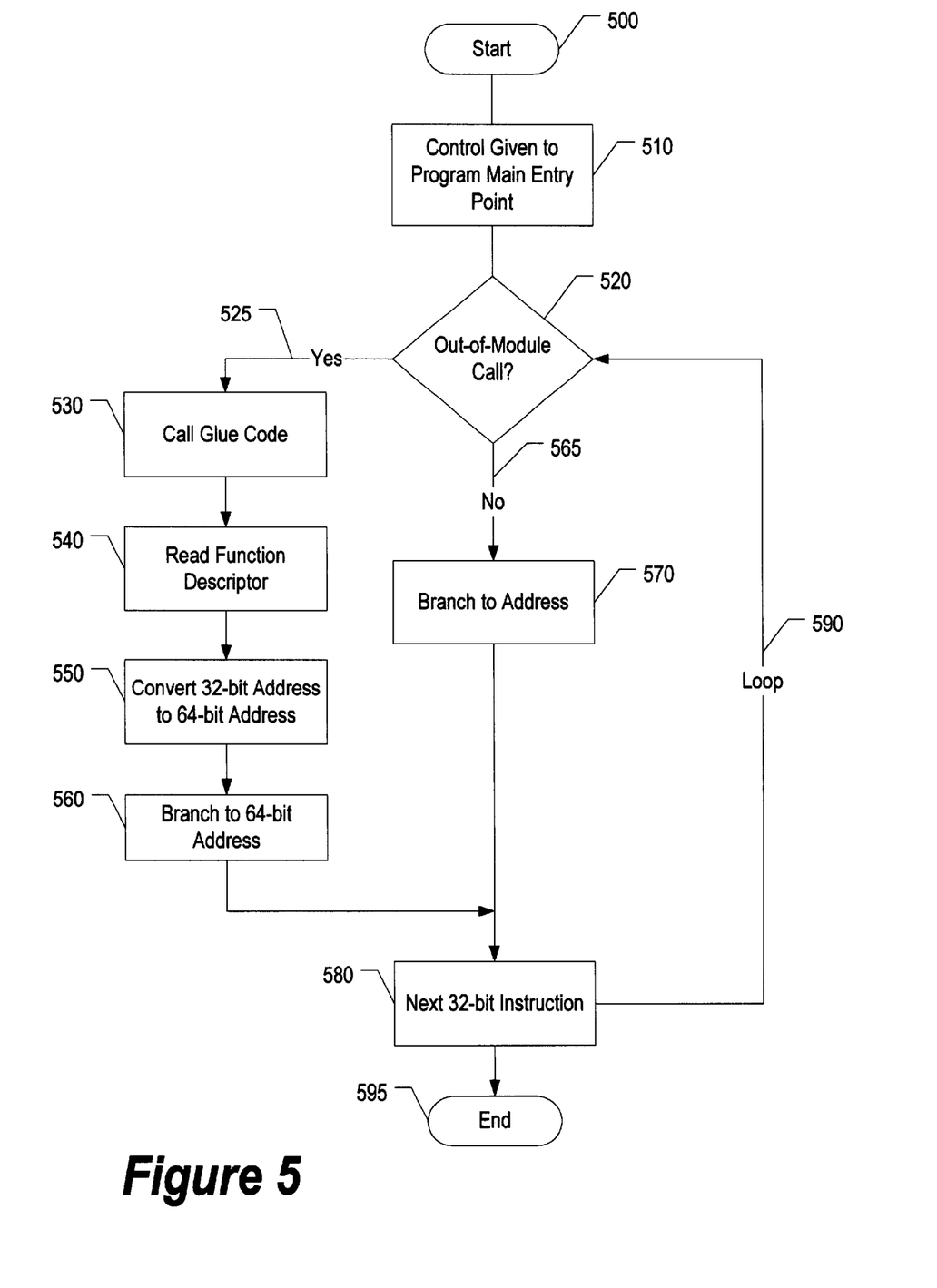
FIG. 5 is a flowchart of out of module call logic.

FIG. 5 shows a flowchart for processing 32 bit instructions when control is passed to the 32 bit program's main entry point. Control is passed to the 32 bit program after preprocessing the out of module addresses shown in FIG. 4. Processing commences (500) whereupon control is given to the 32 bit program's main entry point (step 510). If the first instruction is an out of module call, decision 520 branches to "yes" branch 525. Out of module call processing commences with calling glue code (step 530). The glue code reads the function descriptor within the 32 bit address (540) and converts the 32 bit address to a 64 bit address (550) by copying the 3 low order bits of the 32 bit address to the 3 high order bits and copying the 32 bits of the 32 bit address to the low 32 bits of the 64 bit address. Once the address has been converted, the program branches to the 64 bit out of module address. The 64 bit out of module address may very well be in a region separate from the region within which the 32 bit program is stored. If the instruction is not an out of module call (decision 520), "no" branch 565 is taken whereupon the program branches to the in module address (step 570). After the instruction has been processed, the next 32 bit instruction is processed (step 580), looping back (loop 590) to determine whether the instruction is an out of module call (decision 520). Processing continues until no more instructions need to be processed whereupon processing terminates at end (595).

Figure 6:
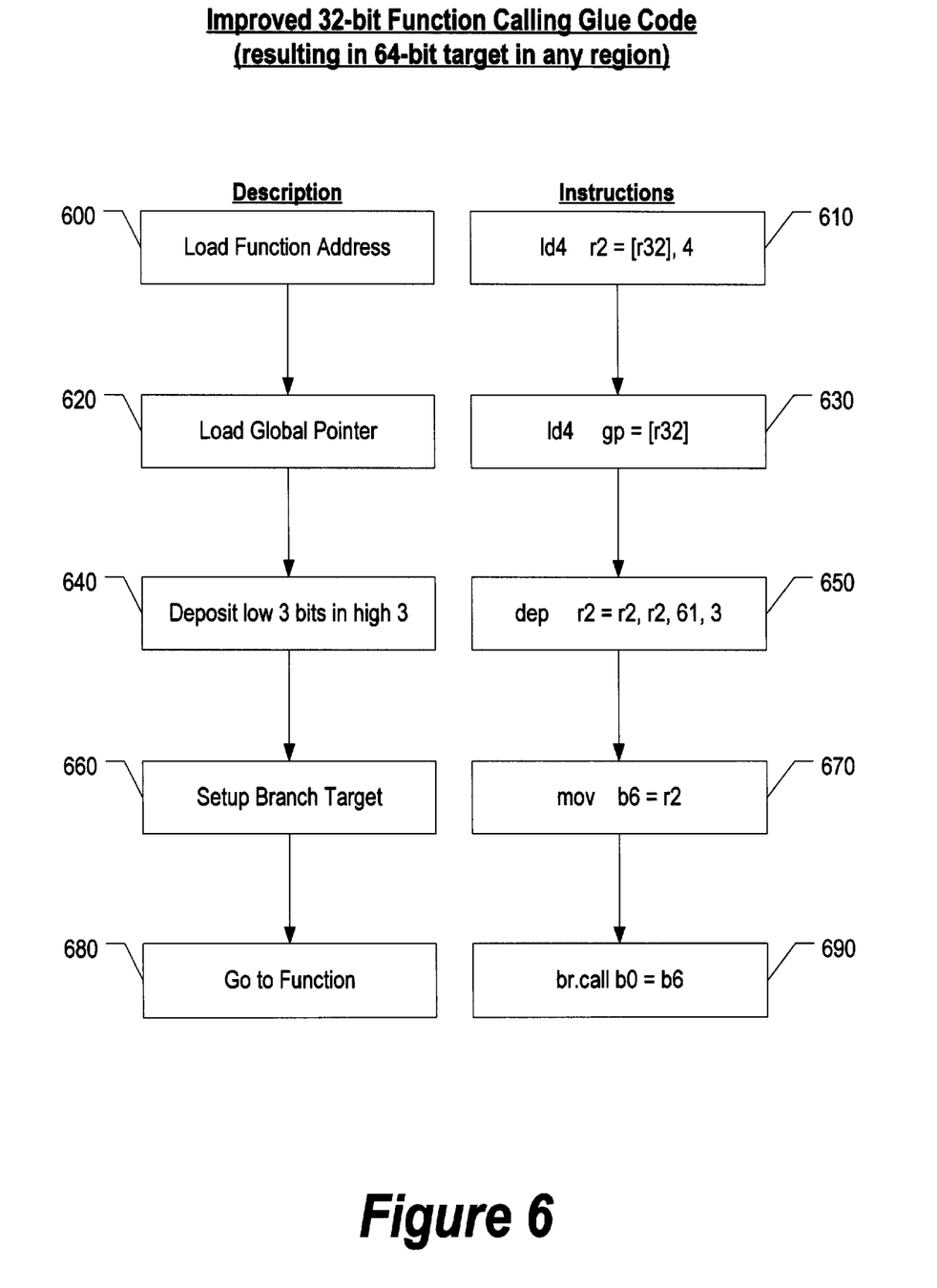
FIG. 6 shows two flowcharts for processing glue code logic.

FIG. 6 shows details of the glue code used to process the 32 bit branch target address and convert the address into a 64 bit branch target address with a region index. The left column shows a description of the step being performed while the right column shows the corresponding assembly instruction used. The function address is loaded into a register (step 600). Assembly instruction 610 shows the corresponding load operation (ld4, a mnemonic for loading 4 bytes) into register 2. Next, the global pointer is loaded (step 620). Assembly instruction 630 shows another load operation, this time loading the global pointer (gp). The low three bits of the 32 bit address are deposited into the high 3 bits of the 64 bit address (step 640). Corresponding assembly instruction 650 shows the deposit (dep) instruction used to deposit the bits into the address stored at register 2. A branch target is then setup (step 660) that will branch to the 64 bit address that has been modified to contain a region index. Corresponding assembly instruction 670 shows a move operation used to set the branch target. Finally, the out of module function is called (step 680). Corresponding assembly instruction 690 shows the call instruction used to go to the out of module function.

The step that deposits, or copies, the 3 low order bits from the 32 bit address into the 3 high order bits of the 64 bit address is preferably accomplished in a single step (see step 640 and corresponding assembly instruction 650). Using a single assembly step increases performance over other methods that may require multiple steps to address a region containing an out of module reference.

Figure 7:
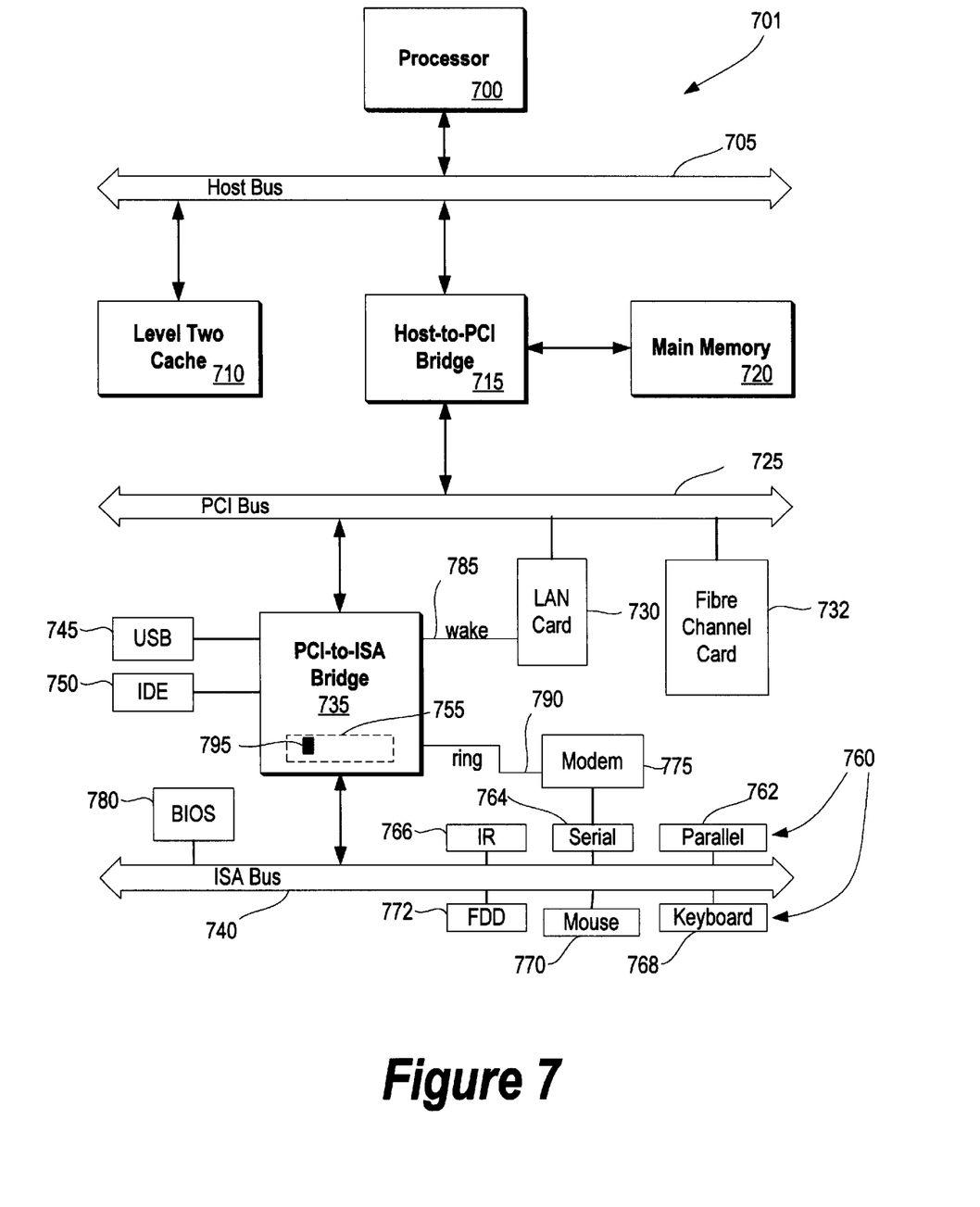
FIG. 7 is a block diagram of an information handling system capable of implementing the present invention.

FIG. 7 illustrates information handling system 701 which is a simplified example of a computer system capable of performing the present invention. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (FDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method of converting a 32 bit address into a 64 bit address, said method comprising:

copying one or more low order bits from the 32 bit address into one or more high order bits in the 64 bit address, wherein the 32 bit address does not include the high order bits.

2. The method as described in claim 1 wherein the source location is the three lowest order bit addresses within the 32 bit address and the target location is the three highest order bit addresses within the 64 bit address.

3. The method as described in claim 1 further comprising:

processing an external call instruction within a 32 bit program;

locating an external module location corresponding to the external call instruction;

determining a memory region index corresponding to the external module location; and storing the memory region index in the source location of the 32 bit address.

4. The method as described in claim 3 wherein the external call instruction corresponds to a shared external library.

5. The method as described in claim 3 wherein the external call instruction corresponds to a system call.

6. The method as described in claim 1 wherein the copying comprises executing a single assembler deposit instruction.

7. The method as described in claim 1 further comprising:

branching to the 64 bit address.

8. The method as described in claim 1 further comprising:

determining a region index;

storing the region index in the lowest three order bits of the 32 bit address;

copying the 32 bit address into the low 32 bits of the 64 bit address;

depositing the lowest order three bit values from the 32 bit address into the highest three order bit values in the 64 bit address; and branching to the 64 bit address.

9. The method as described in claim 1 further comprising:

executing a 32 bit program;

invoking a run-time linker, the run time linker reading an external reference included in the 32 bit program;

loading a dynamic library corresponding with the external reference into a shared memory area;

processing an external call instruction included in the 32 bit program and corresponding with the dynamic library, the external call instruction including the 32 bit address;

determining a region index corresponding with the loaded dynamic library;

modifying the 32 bit address by storing the region index in the three low order bits of the 32 bit address;

passing control to an entry point corresponding to the 32 bit program;

converting the modified 32 bit address into the 64 bit address, the converting including depositing the three low order bits of the 32 bit address into the three high order bits of the 64 bit address; and branching to the 64 bit address.

10. The method as described in claim 1 further comprising:

copying the 32 bit address into the low 32 bits of the 64 bit address;

depositing bit values from the indicator included in the 32 bit address into the indicator location included in the upper bits of the 64 bit address; and branching to the 64 bit address.

11. An information handling system comprising:

one or more 64 bit processors;

a memory accessible by the processors, the memory including a plurality of regions;

a nonvolatile storage device accessible by the processors; and a 32 bit program execution tool, the 32 bit program execution tool including:
  means for copying one or more low order bits from the 32 bit address into one or more high order bits in the 64 bit address,
  wherein the 32 bit address does not include the high order bits.

12. The information handling system as described in claim 11 wherein the source location is the three lowest order bit addresses within the 32 bit address and the target location is the three highest order bit addresses within the 64 bit address.

13. The information handling system as described in claim 11 wherein the 32 bit program execution tool further includes:

means for processing an external call instruction within a 32 bit program;

means for locating an external module location corresponding to the external call instruction;

means for determining a memory region index corresponding to the external module location; and means for storing the memory region index in the source location of the 32 bit address.

14. The information handling system as described in claim 13 wherein the external call instruction corresponds to a shared external library.

15. The information handling system as described in claim 13 wherein the external call instruction corresponds to a system call.

16. The information handling system as described in claim 11 wherein the means for copying comprises means for executing a single assembler deposit instruction.

17. The information handling system as described in claim 11 wherein the 32 bit program execution tool further includes means for branching to the 64 bit address.

18. The information handling system as described in claim 11 wherein the 32 bit program execution tool further includes:

means for determining a region index;

means for storing the region index in the lowest three order bits of the 32 bit address;

means for copying the 32 bit address into the low 32 bits of the 64 bit address;

means for depositing the lowest order three bit values from the 32 bit address into the highest three order bit values in the 64 bit address; and means for branching to the 64 bit address.

19. The information handling system as described in claim 11 wherein the 32 bit program execution tool further includes:

means for executing a 32 bit program;

means for invoking a run-time linker, the run time linker including means for reading an external reference included in the 32 bit program;

means for loading a dynamic library corresponding with the external reference into a shared memory area;

means for processing an external call instruction included in the 32 bit program and corresponding with the dynamic library, the external call instruction including the 32 bit address;

means for determining a region index corresponding with the loaded dynamic library;

means for modifying the 32 bit address by storing the region index in the three low order bits of the 32 bit address;

means for passing control to an entry point corresponding to the 32 bit program;

means for converting the modified 32 bit address into the 64 bit address, the converting including depositing the three low order bits of the 32 bit address into the three high order bits of the 64 bit address; and means for branching to the 64 bit address.

20. A computer program product for converting a 32 bit address into a 64 bit address, said computer program product comprising:

means for copying one or more low order bits from the 32 bit address into one or more high order bits in the 64 bit address, wherein the 32 bit address does not include the high order bits.

21. The computer program product as described in claim 20 wherein wherein the source location is the three lowest order bit addresses within the 32 bit address and the target location is the three highest order bit addresses within the 64 bit address.

22. The computer program product as described in claim 20 further comprising:

means for processing an external call instruction within a 32 bit program;

means for locating an external module location corresponding to the external call instruction;

means for determining a memory region index corresponding to the external module location; and means for storing the memory region index in the source location of the 32 bit address.

23. The computer program product as described in claim 22 wherein the external call instruction corresponds to a shared external library.

24. The computer program product as described in claim 22 wherein the external call instruction corresponds to a system call.

25. The computer program product as described in claim 20 wherein the means for copying comprises means for executing a single assembler deposit instruction.

26. The computer program product as described in claim 20 further comprising:

means for branching to the 64 bit address.

27. The computer program product as described in claim 20 further comprising:

means for determining a region index;

means for storing the region index in the lowest three order bits of the 32 bit address;

means for copying the 32 bit address into the low 32 bits of the 64 bit address;

means for depositing the lowest order three bit values from the 32 bit address into the highest three order bit values in the 64 bit address; and means for branching to the 64 bit address.

28. The computer program product as described in claim 20 further comprising:

means for executing a 32 bit program;

means for invoking a run-time linker, the run time linker including means for reading an external reference included in the 32 bit program;

means for loading a dynamic library corresponding with the external reference into a shared memory area;

means for processing an external call instruction included in the 32 bit program and corresponding with the dynamic library, the external call instruction including the 32 bit address;

means for determining a region index corresponding with the loaded dynamic library;

means for modifying the 32 bit address by storing the region index in the three low order bits of the 32 bit address;

means for passing control to an entry point corresponding to the 32 bit program;

means for converting the modified 32 bit address into the 64 bit address, the converting including depositing the three low order bits of the 32 bit address into the three high order bits of the 64 bit address; and means for branching to the 64 bit address.

29. A computer implemented method of converting a 32 bit address into a 64 bit address, said method comprising:

determining an indicator within one or bits of the 32 bit address;

determining an indicator location within the upper 32 bits of the 64 bit address; and copying the indicator to the indicator location.

30. The method as described in claim 29 wherein the indicator is a memory region index.

31. The method as described in claim 29 wherein the indicator location is in the three highest order bits included in the 64 bit address.

32. The method as described in claim 29 wherein the indicator is the three lowest order bits included in the 32 bit address.

33. The method as described in claim 29 further comprising:

processing an external call instruction within a 32 bit program;

locating an external module location corresponding to the external call instruction;

determining a memory region index corresponding to the external module location: and storing the memory region index in the indicator.

34. The method as described in claim 33 wherein the external call instruction corresponds to a shared external library.

35. The method as described in claim 33 wherein the external call instruction corresponds to a system call.

36. The method as described in claim 29 wherein the copying comprises executing a single assembler deposit instruction.

37. The method as described in claim 29 further comprising:

branching to the 64 bit address.

* * * * *